United States Patent [19]

Olbrueck et al.

[11] Patent Number: 4,619,711

[45] Date of Patent: Oct. 28, 1986

[54] PAINT STRIPPING FOAM

[75] Inventors: Peter Olbrueck, Ratingen; Hermann Kluth, Duesseldorf; Bernhard Roederhoff, Duesseldorf; Wolfgang Dierichs, Duesseldorf; Juergen Wegner, Duesseldorf, all of Fed. Rep. of Germany

[73] Assignee: Henkel Kommanditgesellschaft auf Aktien, Duesseldorf, Fed. Rep. of Germany

[21] Appl. No.: 767,542

[22] Filed: Aug. 20, 1985

[30] Foreign Application Priority Data

Sep. 24, 1984 [DE] Fed. Rep. of Germany ....... 3434985

[51] Int. Cl.$^4$ .................. B08B 7/00; C23D 17/00; C09K 13/02; B44C 1/22
[52] U.S. Cl. ................................ 134/38; 156/654; 156/668; 252/79.5; 252/156; 252/DIG. 8
[58] Field of Search ............... 252/79.5, 156, DIG. 8; 134/38; 15/208; 156/625, 640, 654, 668

[56] References Cited

U.S. PATENT DOCUMENTS 2,969,328  1/1961  Ellenson et al. ............... 134/38 X
4,426,250  1/1984  Brailsford ........................ 156/655

FOREIGN PATENT DOCUMENTS 2069522  8/1981  United Kingdom .

*Primary Examiner*—William A. Powell
*Attorney, Agent, or Firm*—Ernest G. Szoke; Henry E. Millson, Jr.

[57] ABSTRACT

An aqueous alkaline paint stripper composition which forms a foam when dispersed from an aerosol container comprising:

A. from 47 to 94% by weight of an aqueous solution containing from about 5 to about 40% by weight of at least one strongly alkaline substance,
B. from 1 to 8% by weight of at least one surfactant,
C. from 5 to 30% by weight of at least one propellant,
D. from 0 to 5% by weight of at least one foam stabilizer and/or thickener, and
E. from 0 to 10% by weight of at least one water-miscible organic solvent, and a method of stripping paint using the above paint stripper composition.

19 Claims, No Drawings

PAINT STRIPPING FOAM

BACKGROUND OF THE INVENTION

1. Field of the Invention

This invention relates to a strongly alkaline paint stripper having the consistency of shaving foam which is suitable for removing hydrolyzable paint coatings on alkali-stable substrates, such as wood for example.

2. Description of Relevant Art

Strongly alkaline strippers containing sodium hydroxide, potassium hydroxide, or ammonium hydroxide as the active constituent have been used for many years for removing hydrolyzable paint coatings. Since the stripping process is based on a chemical reaction lasting from a few minutes to a few hours, the main problem in using these products is to keep the stripping solution in prolonged contact with the lacquer layer to be removed. To this end, it is proposed in British Pat. No. 2,069,522 to add a skin-forming component to the stripper so that a removable skin is formed when the aqueous composition is applied to the painted surface to be stripped. According to U.S. Pat. No. 4,426,250, a "masking agent", for example in the form of a sheet-form textile, is added to the stripper and may be subsequently removed with the stripped paint coating. In both cases, it is feasible—in rooms with sufficient humidity—for the alkaline stripper to be kept in prolonged contact in active, i.e., moist form, with the paint coating to be stripped. However, other disadvantages arise, particularly in the case of objects having angled surfaces, for example latheturned bars and rods. The strippers according to British Pat. No. 2,069,522 have a paste-like consistency and have to be applied with spatulas or trowels with complete surface coverage. In the case of the strippers according to U.S. Pat. No. 4,426,250, the textile mask has to be adapted to the surface which, in some cases, is only possible with considerable difficulty, i.e., with heavy consumption of material.

DESCRIPTION OF THE INVENTION

Accordingly, an object of the present invention is to provide an alkaline paint stripper which can be applied quickly, easily and cleanly to surfaces of any geometry and any inclination and which remain in contact therewith for a sufficiently long period without drying or running.

Other than in the operating examples, or where otherwise indicated, all numbers expressing quantities of ingredients or reaction conditions used herein are to be understood as modified in all instances by the term "about."

The present invention relats to an aqueous alkaline paint stripper to be applied as a foam, which contains, based on the preparation as a whole:

A. from 47 to 94% by weight of an aqueous solution containing from about 5 to about 40% by weight of at least one strongly alkaline substance,
B. from 1 to 8% by weight of at least one surfactant,
C. from 5 to 30% by weight of at least one propellant, and, optionally,
D. from 0 to 5% by weight of at least one foam stabilizer and/or thickener,
E. from 0 to 10% by weight of at least one water-miscible organic solvent.

In one embodiment, the invention relates to a propellent-containing stripping foam packed in an aerosol can.

The stripping foam of the invention contains one or more of an alkali metal hydroxide and/or an ammonium hydroxide as the strongly alkaline component A. Potassium hydroxide, sodium hydroxide and/or ammonia solution are preferred. Tetraalkylammonium hydroxides, for example tetraethylammonium hydroxide or tetramethylammonium hydroxide, can also be used. The above alkaline (alkalizing) agents are present in the preparations in the form of 5 to 40% by weight aqueous solutions. It is preferred to use from 10 to 30% by weight solutions and, more preferably, from 15 to 20% by weight solutions. It is, of course, an obvious alternative which is within the scope of the invention to add the alkaline agent in solid or liquid form together with the other ingredients to water to form the aqueous paint stripper of the invention, or to first form separate aqueous solutions of one or more of the water soluble components and mix such aqueous solutions together to obtain the above paint stripper composition.

The preparations of the invention contain one or more surfactants as component B. The function of the surfactant is, on the one hand, to wet hydrophobic painted surfaces and, on the other, to produce a stable foam. Any surfactants compatible with strong alkalis can be used herein. Thus, it is possible to use anionic surfactants, nonionic surfactants, or amphoteric surfactants. Cationic surfactants are also suitable. The surfactants are used in the quantity necessary to obtain the desired foam stability. Thus, it is generally not necessary to use more than 8% by weight of surfactants, based on the preparation as a whole. On the other hand, if the surfactants are used in quantities of less than 1%, the foam stability is generally inadequate for prolonged stripping operations. Accordingly, the surfactants are generally used in quantities of from 1 to 8% by weight, but in many cases in quantities of only from 1 to 6% by weight or from 1 to 4% by weight. Favorable results are generally obtained with quantities of only 1.5 to 3% by weight.

In the context of the invention, surfactants are understood quite generally to be substances which, in addition to a generally aliphatic hydrocarbon radical containing from 8 to 26, preferably from 10 to 22 and, more preferably, from 12 to 18 carbon atoms or an alkyl aromatic radical containing from 6 to 18 and preferably from 8 to 16 aliphatic carbon atoms, contain a water-solubilizing anionic, zwitter ionic, cationic or nonionic group.

Soaps of natural or synthetic, saturated or unsaturated fatty acids, and also soaps of resinic or naphthenic acids can be used as the anionic surfactants in the paint strippers of the invention. Other suitable synthetic anionic surfactants are those of the sulfonate, sulfate or synthetic carboxylate type.

Suitable surfactants of the sulfonate type are alkylbenzene sulfonates ($C_9$–$C_{15}$ alkyl), mixtures of alkene and/or hydroxyalkane sulfonates, and disulfonates of the type obtained, for example, from monoolefins containing a terminal or internal double bond by sulfonation with gaseous sulfur trioxide and subsequent alkaline or acidic hydrolysis of the sulfonation products. Other suitable sulfonate surfactants are alkane sulfonates of the type obtainable from alkanes by sulfochlorination or sulfoxidation and subsequent hydrolysis or neutralization, or by the addition of bisulfites onto olefins. Other suitable surfactants of the sulfonate type are the α-sulfofatty acids obtainable from α-sulfofatty acid esters.

Suitable surfactants of the sulfate type are sulfuric acid monoesters of primary alcohols, for example fatty alcohols, hydroxyalkylbenzenes, alkylphenols or reaction products thereof with ethylene oxide or coconut oil fatty alcohols, tallow fatty alcohols or oleyl alcohol. It is also possible to use the sulfuric acid monoesters of secondary alcohols, for example of secondary alcohols of the type obtainable by the socalled Guerbet reaction from fatty alcohols with doubling of the number of carbon atoms. Other suitable sulfuric acid monoesters can be obtained from fatty acid alkanolamides, fatty acid monoglycerides or from the adducts of from 1 to 10 moles and preferably from 1 to 4 moles of ethylene oxide or propylene oxide with primary or secondary fatty alcohols or alkylphenols.

Other suitable anionic surfactants are the fatty acid amides of aminocarboxylic acids or sulfonic acids, such as, for example, fatty acid sarcosides, taurides or isethionates.

A preferred class of anionic surfactants are phosphoric acid mono- and/or diesters of fatty alcohols, alkylphenols, ethoxylated fatty alcohols and/or ethoxylated alkylphenols (from 1 to 10 moles and preferably from 1 to 4 moles EO per mole of alcohol). Dodecyl diphenyl ether disulfonates are also suitable.

Suitable nonionic surfactants are adducts of from 4 to 40 moles and preferably from 4 to 20 moles of ethylene oxide with 1 mole of fatty alcohol, alkylphenol, fatty acid, fatty amine, fatty acid amide or alkane sulfonamide. Of particular importance are the adducts of from 5 to 16 moles of ethylene oxide with coconut oil or tallow fatty alcohols, with oleyl alcohol or with secondary alcohols containing from 8 to 18 and preferably from 12 to 18 carbon atoms and with mono- or dialkylphenols containing from 6 to 14 carbon atoms in the alkyl groups. Other suitable nonionic surfactants are the water-soluble adducts—containing from 20 to 250 ethylene glycol ether groups and from 10 to 100 propylene glycol ether groups—of ethylene oxide with propylene glycol, alkylene diamine polypropylene glycol and alkyl propylene glycols containing from 1 to 10 carbon atoms in the alkyl chain, in which the propylene glycol chain acts as a hydrophobic residue. Preferred nonionic surfactants are, for example, the reaction products of oleyl-cetyl alcohol with 2 or 5 moles of ethylene oxide.

The foaming power of the surfactants can be increased by combining several surfactants or several types of surfactants. This can readily be determined by the expert in preliminary tests in which the solutions are mixed, shaken in a measuring apparatus to observe the height of the foam and then measured. Suitable foam stabilizers, above all for surfactants of the sulfonate or sulfate type, are capillary-active carboxy- or sulfobetaines and also the above mentioned nonionic surfactants of the alkylol amide type. In addition, fatty alcohols and higher terminal diols have already been proposed for this purpose.

The paint strippers of the invention can also contain amphoteric or zwitter ionic surfactants as surfactants. Surfactants of this type are substances which contain in the molecule both acidic groups, such as for example, carboxyl, sulfo, sulfuric acid semiester, phosphono or phosphoric acid partial ester groups, and also basic groups, such as for example amino, imino or ammonium groups. Particularly suitable surfactants of this type are the betaines and sulfo betaines. Betaines are zwitter ionic compounds containing a tetrasubstituted quaternary ammonium group and a covalently bound acid group. The compounds generally contain on the nitrogen one or at most 2 long-chain radicals containing more than 8 carbon atoms. The anionic, water-solubilizing acid group is attached to the ammonium nitrogen by another substituent which generally consists of a short-chain aliphatic radical optionally containing a double bond or a hydroxyl group. The remaining groups are alkyl radicals containing from 1 to 3 carbon atoms which, if they are longer than the $C_1$, can also contain hydroxyl groups.

Finally, it is possible to use cationic surfactants such as, for example, quaternary ammonium salts containing at least one long-chain radical with 12 or more carbon atoms. Suitable cationic surfactants are, for example, trialkylammonium hydroxides or salts thereof. Thus, lauryl trimethylammonium chloride is a suitable cationic surfactant. The corresponding ethyl and propyl compounds can also be used.

In one preferred embodiment, the paint strippers are packed in aerosol cans. The advantage of this is that, when the valve is opened, the preparation is obtained in the form of a stable foam. For such application, therefore, the preparations contain a propellent (component C). Suitable propellents are of both the inflammable and non-inflammable types. Particularly preferred non-inflammable propellents are fluorinated hydrocarbons. Thus, it is possible to use dichlorodifluorormethane for example. On the other hand, inflammable, low-boiling organic solvents can also be used. Suitable propellents of this type are, on the one hand, ethers, such as dimethylether, and, on the other hand, alkanes, such as butane or pentane, or mixtures or isomers thereof. Another suitable propellent is nitrous oxide ($N_2O$, laughing gas). The propellent should be used in a quantity of from 5 to 30% by weight. However, favorable results are generally obtained with from 10 to 25% by weight and, more particularly, with from 10 to 15% by weight of propellent.

The paint strippers according to the invention can optionally also contain up to 5% by weight, preferably from 1 to 5% by weight, based on the preparation as a whole, of foam stabilizers and/or thickeners (component D.). Suitable thickeners include both inorganic and organic thickeners. Suitable inorganic thickeners are waterglasses, although it is known that, in strongly alkaline preparations, waterglasses hydrolyze to relatively low molecular weight silicates. Alkali-stable hydrophilic polymers can be used as the organic thickeners. Thus, polymers of acrylic acid and/or methacrylic acid for example, are suitable thickeners. Other suitable thickeners are polysaccharides. Thus, it is possible for example, to use natural polysaccharides such as xanthan, and also reaction products of cellulose and guar. Thus, cellulose ethers are particularly suitable thickeners. Examples include carboxymethyl cellulose, methyl cellulose or hydroxyethyl cellulose.

The stripping foams of the invention can also optionally contain up to 10% by weight, preferably from 1 to 10% by weight, of water-miscible organic solvents (component E.). In this connection, it is important to ensure by carrying out suitable preliminary tests that both the consistency and stability of the foams remain intact. Suitable solvents are, for example, monohydric $C_1$, $C_2$, $C_3$, $C_4$, $C_5$ and $C_6$ alcohols which can be linear, branched or cyclic. Other suitable solvents are dihydric alcohols, for example ethylene glycol, propylene glycol or the isomeric butane diols. Finally, monoalkyl ethers of the above-mentioned glycols with the above-mentioned alcohols are also suitable.

In another embodiment of the invention, the paint strippers are prepared without propellents. In this case, foaming is carried out by mixing with propellents before application.

Before application, the paint strippers of the invention are first brought into the form of a foam, preferably having the consistency of shaving foam. This can be done either by removing the product from an aerosol can under the natural pressure of the propellents or by mechanical foaming. The foam is then applied to the paint coating to be removed at ambient temperature and allowed to act in the usual way. The foams are not film-forming, even when they contain thickeners.

For application over large areas, the stripping foam composition is applied from industrial applicators consisting of pressure tanks, metering pumps, mixing units and outlet valves of suitable geometry.

The foam-like consistency of the paint stripper affords many advantages. Thus, the stripping foams are very light and remain in place, even on vertical surfaces. Compared with paste-like preparations, the foams are used very sparingly, which reduces costs and eliminates problems of waste. This applies even when the foam is applied in an approximately 1 cm thick layer. Another advantage of the foam applied from aerosol cans lies in the fact that, immediately after leaving the can, the foam continues expanding so that even depressions and cracks in the painted surface are wetted.

The invention will be illustrated, but not limited, by the following examples.

EXAMPLE 1

An aerosol can was filled with a mixture of:
15 g of potassium hydroxide,
10 g of a 30% by weight aqueous solution of a nonionic surfactant (adduct of 5 moles of ethylene oxide with 1 mole of tallow fatty alcohol),
62 g of water,
12 g of dichlorodifluoromethane.

EXAMPLE 2

The procedure was as in Example 1, except that the 15 g of potassium hydroxide were replaced by 15 g of sodium hydroxide.

EXAMPLE 3

The procedure was as in Example 1, except that the 10 g of a 30% by weight solution of a nonionic surfactant were replaced by the same quantity of a 30% by weight solution of lauryl trimethylammonium chloride in water.

EXAMPLE 4

The procedure was as in Example 1, except that 5 g of a 30% by weight solution of oleyl-cetyl alcohol and 2 moles of ethylene oxide and 5 g of a 30% by weight solution of oleyl-cetyl alcohol and 5 moles of ethylene oxide were used as surfactants.

EXAMPLE 5

The aerosol cans were fitted with a wide slot nozzle. A vertical, painted wooden surface was then uniformly coated in a thickness of about 1 cm. The foam was finely porous (consistency of shaving foam), could be accurately applied, did not run down and was stable for more than 2 hours, even in a heated room of low air humidity. The hydrolyzable paint coating was then removed with a scraper only 45 minutes after application.

To strip a large area, a solution was prepared in a tank from
15 kg of potassium hydroxide,
5 kg of a 30% by weight solution of an adduct of oleyl-cetyl alcohol and 2 moles of ethylene oxide,
5 kg of a 30% by weight solution of an adduct of 5 moles of ethylene oxide with oleyl-cetyl alcohol and
65 kg of water.

10 kg of dichlorodifluoromethane were introduced under pressure into a second tank. The components were introduced via metering pumps into a static mixer and then applied over large areas through an outlet valve, with the same results obtained in Example 5.

What is claimed is:

1. An aqueous alkaline paint stripper composition which forms a foam when dispersed from an aerosol container comprising:
   A. from about 47 to about 94% by weight of an aqueous solution containing from about 5 to about 40% by weight of at least one strongly alkaline substance,
   B. from about 1 to about 8% by weight of at least one surfactant,
   C. from about 5 to about 30% by weight of at least one propellant,
   D. from 0 to about 5% by weight of at least one foam stabilizer and/or thickener, and
   E. from 0 to about 10% by weight of at least one water-miscible organic solvent.

2. An aqueous paint stripper composition in accordance with claim 1 wherein the at least one strongly alkaline substance in A. is one or more of sodium hydroxide, potassium hydroxide, and a tetraalkylammonium hydroxide.

3. An aqueous paint stripper composition in accordance with claim 1 wherein component B. is present in from about 1 to about 6% by weight.

4. An aqueous paint stripper composition in accordance with claim 1 wherein component B. is present in from about 1.5 to about 3% by weight.

5. An aqueous paint stripper composition in accordance with claim 1 wherein the at least one surfactant in B. is at least one of an anionic surfactant, an amphoteric surfactant, and a nonionic surfactant.

6. An aqueous paint stripper composition in accordance with claim 1 wherein the at least one surfactant in B. is at least one of a fatty alcohol sulfate, a fatty alcohol ether sulfate, a fatty alcohol phosphate, a fatty alcohol ether phosphate, an alkylbenzene sulfonate, an alkylphenol sulfate, an alkylphenol ether sulfate, a paraffin sulfonate, and dodecyl diphenyl ether disulfonate.

7. An aqueous paint stripper composition in accordance with claim 5 wherein the nonionic surfactant is one or more of a fatty alcohol ethoxylate, an alkylphenol ethoxylate, and an ethylene oxide-propylene oxide block copolymer.

8. An aqueous paint stripper composition in accordance with claim 1 wherein from about 1 to about 3% by weight of at least one foam stabilizer in D. is present in the composition, wherein said foam stabilizer is one or more of a capillary-active carboxybetaine, a capillary-active sulfobetaine, an alkylol amide, a fatty alcohol, and a higher terminal diol.

9. An aqueous paint stripper composition in accordance with claim 1 wherein in component D. a thickening effective quantity of at least one of an acrylic acid polymer, a methacrylic acid polymer, and a polysaccharide is present.

10. An aqueous paint stripper composition in accordance with claim 1 wherein component C. is one or more of a low boiling fluorinated hydrocarbon, an ether, or an alkane.

11. An aqueous paint stripper composition in accordance with claim 1 wherein component E. is present and is one or more of a $C_1$-$C_6$ monohydric alcohol, a $C_2$-$C_4$ dihydric alcohol, and a monoalkyl ether of either of the foregoing having up to 10 carbon atoms.

12. An aqueous paint stripper composition in accordance with claim 1 wherein the composition contains the following:
Component A—about 47 to about 94% by weight of an aqueous solution containg from about 10 to about 30% by weight of at least one strongly alkaline substance,
Component B—from about 1 to about 6% by weight,
Component C—from about 10 to about 25% by weight.

13. An aqueous paint stripper composition in accordance with claim 12 wherein from about 1 to about 5% by weight of component D. is present.

14. An aqueous paint stripper composition in accordance with claim 12 wherein from about 1 to about 10% by weight of component E. is present.

15. An aqueous paint stripper composition in accordance with claim 1 wherein the composition contains the following:
Component A—from about 47 to about 94% by weight of an aqueous solution containing from about 15 to about 20% by weight of at least one strongly alkaline substance,
Component B—from about 1.5 to about 3% by weight,
Component C—from about 10 to about 15% by weight.

16. A method for stripping hydrolyzable paint coatings on alkali-stable substrates comprising applying thereto a foam layer of the composition of claim 1 at ambient temperature.

17. A method in accordance with claim 16 where the composition of claim 1 is applied from an aerosol can.

18. A method in accordance with claim 16 wherein the composition of claim 1 is applied with industrial application equipment.

19. An aerosol can containing the composition of claim 1.

* * * * *